United States Patent
Lam

(10) Patent No.: US 11,449,303 B2
(45) Date of Patent: Sep. 20, 2022

(54) DETERMINING METHOD AND CORRESPONDING SYSTEM OF MUSIC PLAYBACK FOR WHETHER TO PLAY MUSIC BASED ON IMAGE INFORMATION

(71) Applicant: Tymphany Acoustic Technology Limited, Taipei (TW)

(72) Inventor: Yick Hong Lam, Taipei (TW)

(73) Assignee: TYMPHANY ACOUSTIC TECHNOLOGY LIMITED, Taipei (TW)

( * ) Notice: Subject to any disclaimer, the term of this patent is extended or adjusted under 35 U.S.C. 154(b) by 64 days.

(21) Appl. No.: 17/070,422

(22) Filed: Oct. 14, 2020

(65) Prior Publication Data

US 2021/0117148 A1  Apr. 22, 2021

(30) Foreign Application Priority Data

Oct. 18, 2019 (CN) .......................... 201910991876.X

(51) Int. Cl.
*G06F 3/16* (2006.01)
*G06F 3/01* (2006.01)
*G06V 40/10* (2022.01)

(52) U.S. Cl.
CPC .............. *G06F 3/165* (2013.01); *G06F 3/011* (2013.01); *G06V 40/10* (2022.01)

(58) Field of Classification Search
CPC .......... G06F 3/165; G06F 3/011; G06V 40/10
See application file for complete search history.

(56) References Cited

U.S. PATENT DOCUMENTS

| 2008/0129498 A1* | 6/2008 | Howarter ................. G08B 3/10 340/541 |
| 2009/0116684 A1* | 5/2009 | Andreasson ......... G11B 27/105 382/100 |
| 2013/0159350 A1* | 6/2013 | Sankar .................. G06F 16/258 707/E17.005 |
| 2020/0159487 A1* | 5/2020 | Dawson .................. G06F 3/165 |

* cited by examiner

*Primary Examiner* — Fan S Tsang
*Assistant Examiner* — David Siegel
(74) *Attorney, Agent, or Firm* — Muncy, Geissler, Olds & Lowe, P.C.

(57) ABSTRACT

A music playback method for determining, based on image information, whether to play music, includes obtaining at least one detection position image through an image sensing apparatus; determining whether the detection position image meets at least one playback trigger threshold; and starting an audio playback device based on a result of whether the detection position image meets the playback trigger threshold, to output at least one piece of audio content.

5 Claims, 1 Drawing Sheet

```
S101: Obtain at least one detection position image through an image sensing apparatus S102: Determine whether the detection position image meets at least one playback trigger threshold S103: Start an audio playback device based on a result of whether the detection position image meets the playback trigger threshold, to output at least one piece of audio content
```

DETERMINING METHOD AND CORRESPONDING SYSTEM OF MUSIC PLAYBACK FOR WHETHER TO PLAY MUSIC BASED ON IMAGE INFORMATION

CROSS REFERENCE TO RELATED APPLICATIONS

The present application claims priority to Chinese Patent Application No. CN 201910991876X, which was filed on Oct. 18, 2019, the entire contents of which are hereby incorporated by reference.

BACKGROUND OF THE INVENTION

Technical Field

This application relates to a music playback method for determining, based on image information, whether to play music and a corresponding music playback system thereof.

Related Art

In today's society, a user often needs to manually control an audio playback device to play music. Even if the user has a habitual behavior of playing specific music at a specific position, the user still needs to go through same steps every time before playing music. Such a boring behavior causes a hindrance to the user in listening to music.

It can be learned that providing a user with a music listening experience that is smooth and avoids repetitive setting behaviors has become a research direction for those skilled in the art.

SUMMARY

In view of the above problems in the related art, this application provides a music playback method for determining, based on image information, whether to play music and a corresponding music playback system thereof, to improve the overall user experience for users to enjoy music without adding additional hardware or components.

The technical solutions of this application are implemented as follows:

According to one aspect of this application, a music playback method for determining, based on image information, whether to play music is provided, including:

obtaining at least one detection position image through an image sensing apparatus;

determining whether the detection position image meets at least one playback trigger threshold; and starting an audio playback device based on a result of whether the detection position image meets the playback trigger threshold, to output at least one piece of audio content.

According to this embodiment of this application, the detection position image corresponds to a detection position.

According to this embodiment of this application, a plurality of detection position images correspond to a plurality of detection positions.

According to this embodiment of this application, a plurality of playback trigger thresholds correspond to the plurality of detection position images.

According to this embodiment of this application, a result of whether the detection position image meets the playback trigger threshold includes all permutations and combinations of whether the detection position image meets the playback trigger threshold.

According to this embodiment of this application, a plurality of pieces of audio content correspond to different results of whether the detection position image meets the playback trigger threshold.

According to this embodiment of this application, the playback trigger threshold is used to determine whether the detection position image includes a human body image.

According to another aspect of this application, a music playback system is provided, including:

an image sensing apparatus configured to obtain at least one detection position image;

an audio playback device configured to play at least one piece of audio content; and a control unit connected to the image sensing apparatus and the audio playback device and configured to control, based on a result of whether the detection position image meets at least one playback trigger threshold, the audio playback device to output the at least one piece of audio content.

According to this embodiment of this application, the control unit is built in the audio playback device.

According to this embodiment of this application, the control unit is an independent apparatus positioned outside the image sensing apparatus and the audio playback device.

In the above technical solution of this application, IP cameras that are increasingly popular and commonly used at home are used to improve the user experience, so that the IP cameras can be easily integrated with the Internet of Things to provide smart functions, thereby improving the overall user experience for users to enjoy music without adding additional hardware or components and without significantly increasing design costs.

BRIEF DESCRIPTION OF THE DRAWINGS

To describe the technical solutions of the embodiments of this application or the related art more clearly, the accompanying drawings required for describing the embodiments or the related art are briefly described below. Apparently, the accompanying drawings in the following description show only some embodiments of this application, and a person of ordinary skill in the art may still derive other drawings from these accompanying drawings without creative efforts.

DETAILED DESCRIPTION

The technical solutions in the embodiments of this application are clearly and completely described in the following with reference to the accompanying drawings in the embodiments of this application. Apparently, the embodiments to be described are merely a part of this application rather than all of the embodiments. All other embodiments obtained by a person of ordinary skill in the art based on the embodiments of this application fall within the protection scope of this application.

Figure 1:
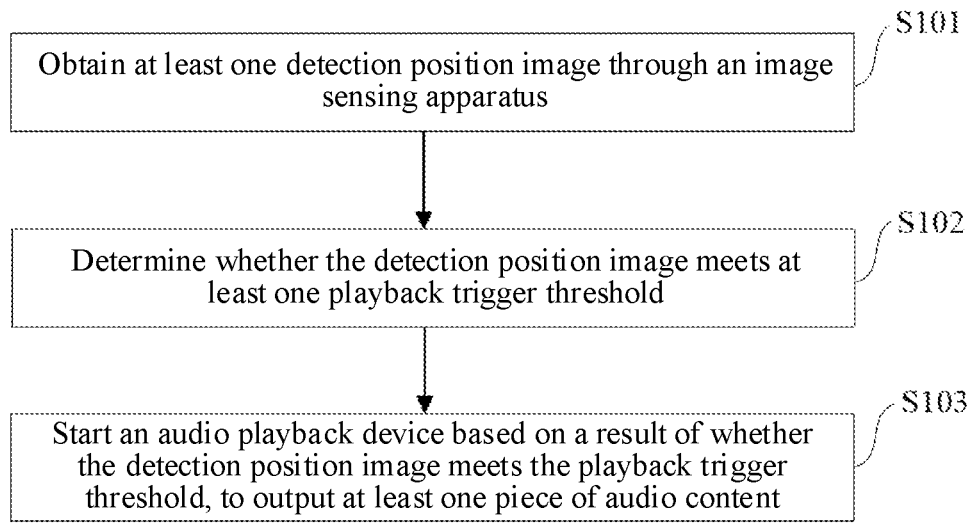
FIG. 1 is a flowchart of a music playback method for determining, based on image information, whether to play music according to an embodiment of this application.

FIG. 1 is a flowchart of a music playback method for determining, based on image information, whether to play music according to an embodiment of this application. As shown in FIG. 1, the music playback method for determining, based on image information, whether to play music in this embodiment of this application includes the following steps.

S101: Obtain at least one detection position image through an image sensing apparatus.

S102: Determine whether the detection position image meets at least one playback trigger threshold.

S103: Start an audio playback device based on a result of whether the detection position image meets the playback trigger threshold, to output at least one piece of audio content.

In step S101, the music playback method in this application includes: obtaining the at least one detection position image through the image sensing apparatus, where the image sensing apparatus may be, but not limited to, an internet protocol camera (IP camera), a TV with an image capturing lens, a computer, a smart speaker, or other electronic devices with an image capturing lens. In addition, in step S101, the detection position image obtained by the image sensing apparatus corresponds to a detection position. In some embodiments, the image sensing apparatus obtains a plurality of detection position images for a plurality of detection positions. However, in another embodiment, the image sensing apparatus obtains one detection position image for one detection position. In other words, the quantity of detection position images obtained by the image sensing apparatus corresponds to the quantity of detection positions.

In step S102, the music playback method in this application includes: determining whether the detection position image meets the playback trigger threshold, where the playback trigger threshold is used to determine whether the detection position image includes a human body image. In other words, step S102 is performed to determine whether there is a human body image at a detection position through the detection position image obtained by the image sensing apparatus. In some embodiments, the image sensing apparatus obtains one detection position image for one detection position, and therefore step S102 is performed to determine whether there is a human body image at the detection position. In addition, in another embodiment, the image sensing apparatus obtains a plurality of detection position images for a plurality of detection positions, and therefore step S102 is performed to determine whether there are human body images at the plurality of detection positions. Determining results may be divided as follows:

1. Human body images appear at all detection positions.
2. No human body image appears at all detection positions.
3. Human body images appear at some detection positions.

Furthermore, with respect to "3. Human body images appear at some detection positions", the results of permutations and combinations corresponding to the quantity of detection positions and the quantity of detection position images may be further generated. In other words, in some embodiments, the results of whether the detection position images meet the playback trigger thresholds include all permutations and combinations of whether the detection position images meet the playback trigger thresholds.

In step S103, the music playback method in this application includes: starting the audio playback device based on a determining result of S102, to output the audio content, where the audio playback device may be, but not limited to, a stereo, a smart speaker, a portable speaker device, or other electronic devices with a speaker function, and the audio content may be, but not limited to, a song, a song list composed of songs, or other multimedia content with an output audio signal. In some embodiments, in S103, different audio content may be played based on the determining result of S102. For example, when the determining result of S102 is that human body images appear at all detection positions, in S103, corresponding first audio content is played based on the determining result of S102. When the determining result of S102 is that human body images appear at some detection positions, in S103, corresponding second audio content is played based on the determining result of S102. It can be learned that, in some embodiments, audio content is a result of whether one detection position image corresponding to one detection position meets the playback trigger threshold. In addition, in another embodiment, a plurality of pieces of audio content corresponds to a plurality of determining results of S102. In other words, the plurality of pieces audio content corresponds to different results of whether the detection position image meets the playback trigger threshold.

Figure 2:
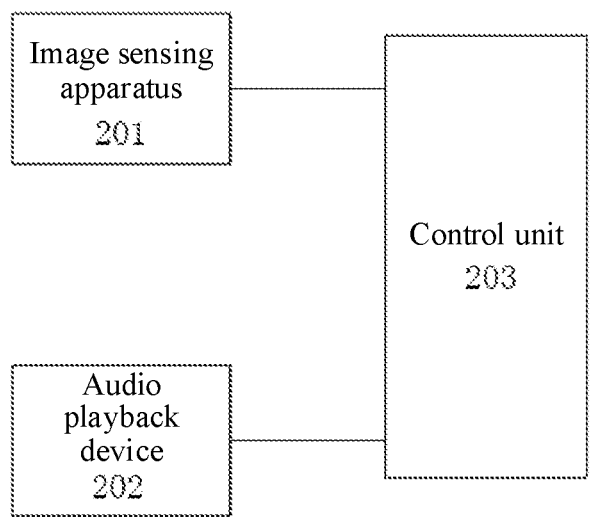
FIG. 2 is a block diagram of a music playback system according to an embodiment of this application.

Referring to FIG. 2, FIG. 2 is a system block diagram of a music playback system based on the method shown in FIG. 1. It should be understood that the system block diagram shown in FIG. 2 is only an example, and any other applicable designs can be made according to actual applications.

As shown in FIG. 2, the music playback system in this application includes an image sensing apparatus 201, an audio playback device 202, and a control unit 203. The image sensing apparatus 201 is configured to obtain a detection position image, where the image sensor apparatus 201 obtains the detection position image based on a detection position. The audio playback device 202 is configured to play audio content, where the audio playback device 202 may be, but not limited to, a stereo, a smart speaker, a portable speaker device, or other electronic devices with a speaker function, and the audio content may be, but not limited to, a song, a song list composed of songs, or other multimedia content with an output audio signal. The control unit 203 is connected to the image sensing apparatus 201 and the audio playback device 202 and is configured to control, based on a result of whether the detection position image meets a playback trigger threshold, the audio playback device 202 to output audio content, where the playback trigger threshold is used to determine whether the detection position image includes a human body image. The control unit 203 may be a unit built in the audio playback device 202, or an independent apparatus built external of the image sensing apparatus 201 and the audio playback device 202, and the control unit 203 may be implemented by a control chip, a processor, or other hardware with an arithmetic processing capability.

Referring again to the music playback system shown in FIG. 2, in a use scenario, when a user appears at a detection position, because the image sensing apparatus 201 obtains the detection position image based on the detection position, the image sensing apparatus 201 may obtain the detection position image including a human body image of the user. When obtaining the detection position image from the image sensing apparatus 201, the control unit 203 may determine whether the detection position image meets the playback trigger threshold. In this use scenario, because the control unit 203 obtains the detection position image including the human body image of the user, the control unit 203 determines that the detection position image meets the playback trigger threshold. Therefore, the control unit 203 controls the audio playback device 202 to output corresponding audio content.

Conversely, in another use scenario, when a user does not appear at a detection position, the image sensing apparatus 201 obtains the detection position image that does not include a human body image of the user. In this use scenario, because the control unit 203 obtains the detection position image that does not include the human body image of the user, the control unit 203 determines that the detection position image does not meet the playback trigger threshold. Therefore, the control unit 203 will not control the audio playback device 202 to output audio content.

Human body image detection is a part of a computer vision technology and one of main goals of artificial intelligence. There is a plurality of methods to implement human body image detection. In an embodiment, OpenCV may be used to implement human body image detection. OpenCV is one of well-known real-time computer vision software libraries. OpenCV uses a histogram gradient object detector, and this also provides a human detector, that is, a human body image detection function. The human body image detection function in this application may be stored and built in the control unit 203, or connected to an external server through the control unit 203 with a networking function, so as to use the human body image detection function stored in the control unit 203. In other embodiments, any applicable method can also be used to perform human body detection, and this is not limited in this application.

In an embodiment, the audio playback device 202 is a network audio device, and stored data may be provided for the audio playback device 202 through a network, so that the audio playback device 202 executes a predetermined customized playlist. Device control software may be integrated with the network audio device 202. The audio playback device 202 may be integrated with a server commonly referred to as a device cloud. The device cloud may identify the audio playback device 202 in an internal network or the Internet to transmit data or a message from the cloud to the audio playback device 202. In this way, in addition to playing music in a traditional way, more custom functions can be provided for the user. For example, a specific playlist is played, or some specific rules are followed to play different playlists on different working days.

According to the above technical solution of this application, a video image technology and an IP camera for human body image detection at a listening position are used to detect whether a user appears at a specific location (eg. a listening position) selected by the user at home to control a network audio device to start playing music. Thus, the following scenario can be implemented. The user comes home from work and sits on the sofa, and captures a video image through the IP camera at home, and a detection part on a media server detects that the user is sitting on the sofa through a video stream and starts to use a relaxation playlist created by the user to transmit music signal to an audio device such as a smart speaker. Obviously, the user starts to play music without performing cumbersome procedures, thereby improving the overall user experience.

The foregoing descriptions are merely exemplary embodiments of this application, but are not intended to limit this application. Any modification, equivalent replacement, or improvement made without departing from the spirit and principle of this application shall fall within the protection scope of this application.

What is claimed is:

1. A music playback determining method, based on image information, whether to play music, comprising:
   obtaining a plurality of detection position images through an image sensing apparatus;
   determining whether the detection position images meet a plurality of playback trigger thresholds; and
   starting an audio playback device, based on a determination result, to output at least one piece of audio content,
   wherein the detection position images correspond to a plurality of detection positions; the playback trigger thresholds correspond to the detection position images; and the playback trigger thresholds are used to determine whether each of the detection position images comprises a human body image, as the determination result.

2. The music playback determining method according to claim 1, wherein the detection position image corresponds to a detection position.

3. A music playback system, comprising:
   an image sensing apparatus configured to obtain a plurality of detection position images;
   an audio playback device configured to play at least one piece of audio content; and
   a control unit connected to the image sensing apparatus and the audio playback device, and configured to determine whether the detection position images meet a plurality of playback trigger thresholds, and to control, based on a determination result, the audio playback device to output the at least one piece of audio content,
   wherein the detection position images correspond to a plurality of detection positions; the playback trigger thresholds correspond to the detection position images; and the playback trigger thresholds are used to determine whether each of the detection position images comprises a human body image, as the determination result.

4. The music playback system according to claim 3, wherein the control unit is built in the audio playback device.

5. The music playback system according to claim 3, wherein the control unit is an independent apparatus built outside the image sensing apparatus and the audio playback device.

* * * * *